United States Patent
Elliott

(10) Patent No.: US 7,353,835 B2
(45) Date of Patent: Apr. 8, 2008

(54) VALVE STEM PROTECTION SYSTEM

(76) Inventor: Lynn H. Elliott, 1000 Uptown Park Blvd., Houston, TX (US) 77056

( * ) Notice: Subject to any disclaimer, the term of this patent is extended or adjusted under 35 U.S.C. 154(b) by 142 days.

(21) Appl. No.: 11/335,364

(22) Filed: Jan. 19, 2006

(65) Prior Publication Data

US 2007/0163654 A1 Jul. 19, 2007

Related U.S. Application Data

(60) Provisional application No. 60/650,398, filed on Feb. 4, 2005.

(51) Int. Cl.
*F16K 27/00* (2006.01)
(52) U.S. Cl. ............... 137/15.11; 137/312; 137/240
(58) Field of Classification Search ........... 137/312, 137/240, 15.11
See application file for complete search history.

(56) References Cited

U.S. PATENT DOCUMENTS

| 4,429,591 | A | | 2/1984 | Zuch | |
|---|---|---|---|---|---|
| 4,863,101 | A | * | 9/1989 | Pater et al. | 137/312 |
| 5,503,180 | A | * | 4/1996 | Nimberger | 137/312 |
| 6,424,928 | B1 | | 7/2002 | Elliott et al. | |
| 6,577,985 | B2 | | 6/2003 | Scalf | |
| 6,615,156 | B2 | | 9/2003 | Elliott et al. | |

* cited by examiner

*Primary Examiner*—Kevin Lee
(74) *Attorney, Agent, or Firm*—Shaper Iler LLP; Sue Z. Shaper

(57) ABSTRACT

An improved stem protector system for valves including an assembly, preferably a sleeve assembly, structured and sized for surrounding a valve stem and for mating with a valve stem actuator, the assembly including at least one port system, the at least one port system having at least one port structure to pass lubricant from outside to inside the system and at least one drainage port to pass water from inside to outside the system. Preferably the lubricant port(s) and the water drainage port(s) are separate.

8 Claims, 3 Drawing Sheets

VALVE STEM PROTECTION SYSTEM

This invention claims priority to and is related to U.S. provisional patent application 60/650,398, filed Feb. 4, 2005, entitled Improved Valve Stem Protection, inventor Lynn H. Elliott. The contents of provisional application 60/650,398 are herein incorporated by reference in their entirety.

FIELD OF THE INVENTION

The invention relates to valve stem protectors, and in particular, to improved methods and apparatus for the lubrication and protection of a valve stem/valve actuator interface.

BACKGROUND OF THE INVENTION

Industrial valves, such as those involved in fluid transmission lines, are typically actuated by the rotation of a stem. Valve actuators are frequently manufactured by different entities than the valves and typically operate by rotating a provided valve stem.

Valve stem covers are utilized for enclosing an exposed valve stem and a valve stem/valve actuator interface in order to protect the stem and interface area from wind, rain, dust, debris and/or generally the environment.

Gate valves and sluice valves can involve quite long threaded stems. Their stem protectors can concomitantly be quite tall and/or long and heavy. See Figure on page D118 of EIM Controls Technical Reference Handbook, First Edition, attached to Information Disclosure Statement.

It is important for the long term trouble free operation of most valves and their actuators to keep the contact area between the actuator and the valve stem not only clean but lubricated. This attention to the actuator/stem interface area is particularly pertinent for gate and sluice valves where the actuator provides a mating threaded nut for running on long threaded stems. When the contact area between an actuator nut and a threaded stem is not maintained adequately cleaned and lubricated, corrosion and disintegration can result.

A field case study performed by the instant inventor in 2004 documented the corrosion and disintegration that could result when the contact area between an actuated nut and a threaded stem was not maintained adequately cleaned and lubricated. In that case an actuator was returned to the instant inventor in March 2004 to disassemble and study the wear on the electrical and mechanical components occasioned in the field since having been shipped to the customer in 1989. The actuator had been located awkwardly on a structure above a gate. Lack of proper lubrication was determined to be the apparent cause for actuator failure. A bronze worm gear was worn due to sliding friction. It was determined as part of the problem that the actuator installation at the job site was awkward, it was difficult to access, and the importance of lubrication was apparently not fully understood. Water in the gear box together with a lack of lubrication were determined to be the causing factors.

Valves, including industrial gate valves and sluice valves, are sometimes situated in hard to reach locations. The threaded stem of a gate or sluice valve, in addition, may be several feet long, resulting in a large and heavy valve stem protector. Lubrication traditionally entails removing the valve stem protector followed by application of lubricant to the contact area between the stem and the actuator nut and then replacement of the stem protector. When the location is difficult to reach and/or the protector is heavy and large, those charged with valve maintenance may forego the actuator/stem lubrication process. This can have unfortunate and undesirable consequences.

The prior art has offered an automated stem lubricator. (See above referenced Figure on page D118.) This lubricator was never significantly commercially successful, presumably due to its complexity and expense. The prior art automated lubricator did not provide any special means for draining any unwanted water or fluid that collected inside the protector, such as by condensation, or that became trapped in the valve stem/actuator cavity or interface area The automated stem lubricator was designed to place, at predetermined time intervals, a small amount of oil from a reservoir into a valve stem/actuator nut contact area, using an oil port located midway up a stem protector sleeve.

The instant invention provides an improved valve stem protector and improved method for lubricating, as well as method for draining unwanted trapped water or the like out of the valve stem/actuator nut cavity or interface area The instant invention provides for lubrication without the removal of the protector, optionally from a distance, eliminating a necessity for reaching an awkward location and/or for removing a heavy large valve stem protector. The instant invention provides, in addition, a further advantage of a draining space or port or channel, for draining unwanted water or trapped fluid out of the valve stem/actuator interface area and/or away from locations sensitive to corrosion. Lubricating grease tends to trap water in the actuator/stem interface area. Preferred embodiments of the instant invention provide a channel, preferably between an inner and an outer sleeve portion of a stem protector assembly, wherein unwanted fluid may naturally drain away or be displaced to drain away. Fresh lubricant can be used to flush water that has collected in the interface area to that channel.

Prior art stem protectors frequently glue an outer sleeve to an inner sleeve and screw the inner sleeve to the valve actuator. If lubricant or grease fills the actuator/stem interface area, no space or channel or port is available or otherwise provided for unwanted fluid drainage from inside the sleeve assembly to outside the sleeve assembly. To flush out water that condensed inside or leaked in and became trapped, the whole protector had to be unscrewed and removed.

To the extent unwanted fluid or water comprises condensation formed on the inside of a protector sleeve, in preferred embodiments of the instant invention the condensation can drip down the inside of the protector sleeve into a space or channel between the protector sleeve and an inner sleeve. The space or channel provides for the fluid to drain to the outside of the sleeve assembly.

To the extent unwanted fluid or water collects by some other means on the inside of the inner sleeve and is trapped down in and around the contact area of the interface of an actuator nut and a valve stem, in this latter case in preferred embodiments a periodic forcing of lubricating fluid into the cavity of the contact area between the actuator nut and the valve stem can force the unwanted fluid that collected therein upward. As lubricant is continued to be applied the unwanted fluid will eventually overflow the inner sleeve and pass out of the assembly through channels between the inner and the outer sleeve. Alternately, the fluid could pass through a port of the inner sleeve.

In preferred embodiments of the instant invention, as in the prior art, the outer sleeve is preferably a tough clear plastic cylinder capped at its upper end. The cylinder preferably fits over a lower inner cylindrical sleeve, typically formed from aluminum. The inner sleeve is typically externally threaded to fit into internal threads provided by a valve actuator and also contains a shoulder upon which the outer protective cylinder can rest. The outer cylinder could be clamped to the inner cylinder or it can also simply rest on top of the inner sleeve, substantially held in place by the stem and gravity. The inner cylindrical sleeve in preferred embodiments contains vertical channels (or channels at least with vertical components) in its outside circumference. The vertical component channels provide for drainage of fluid down the outer wall of the inner cylinder, between the inner and outer sleeves or cylinders, largely propelled by gravity. Drainage could also be enhanced or propelled by pressure or by a capillary effect. The bottoms of the vertical component channels preferably open below the shoulder holding the outer cylinder, thereby permitting fluid to drain to the outside of the sleeve assembly. Preferably two lubrication ports would be provided in the lower or inner sleeve or cylinder.

A specially designed lubrication port could itself provide for drainage outward of fluid such as water. A drainage port is understood broadly to encompass openings and channels as well as a lubricant port.

Suction or pressure could be applied to a port or ports to accomplish or enhance drainage.

A solvent could be applied through a port to the inside of the assembly to pressure or blow out old lubricant and water, prior to applying fresh lubrication.

It is envisioned that the lubrication ports are preferably connected or connectable to lubrication hoses so that if the location of a stem protector assembly is not favorable for convenient hands-on work, lubricant could be provided from a distance through the hoses or lines attached to the ports.

Lubrication could be provided by either a manual lubrication applicator or a powered lubrication applicator.

Again, in operation, as discussed above, as lubricant is applied into a cavity or area wherein an actuator nut contacts stem threads, rising lubricant preferably forces any fluid that has collected therein upwards until the fluid vents through a space provided by the assembly, such as channels between an inner and outer cylinder.

SUMMARY OF THE INVENTION

An improved stem protector system for valves including an assembly, preferably a sleeve assembly, structured and sized for surrounding a valve stem and for mating with a valve stem actuator, the assembly including at least one lubrication port system, the at least one lubrication port system (having at least one port structure to pass lubricant from outside to inside the system and at least one drainage port to pass water from inside to outside the system. Preferably the lubricant port(s) and the water drainage port(s) are separate.

BRIEF DESCRIPTION OF THE DRAWINGS

A better understanding of the present invention can be obtained when the following detailed description of the preferred embodiments are considered in conjunction with the following drawings, in which.

The drawings are primarily illustrative. It would be understood that structure may have been simplified and details omitted in order to convey certain aspects of the invention. Scale may be sacrificed to clarity.

DETAILED DESCRIPTION OF A PREFERRED EMBODIMENT

Figure 1:
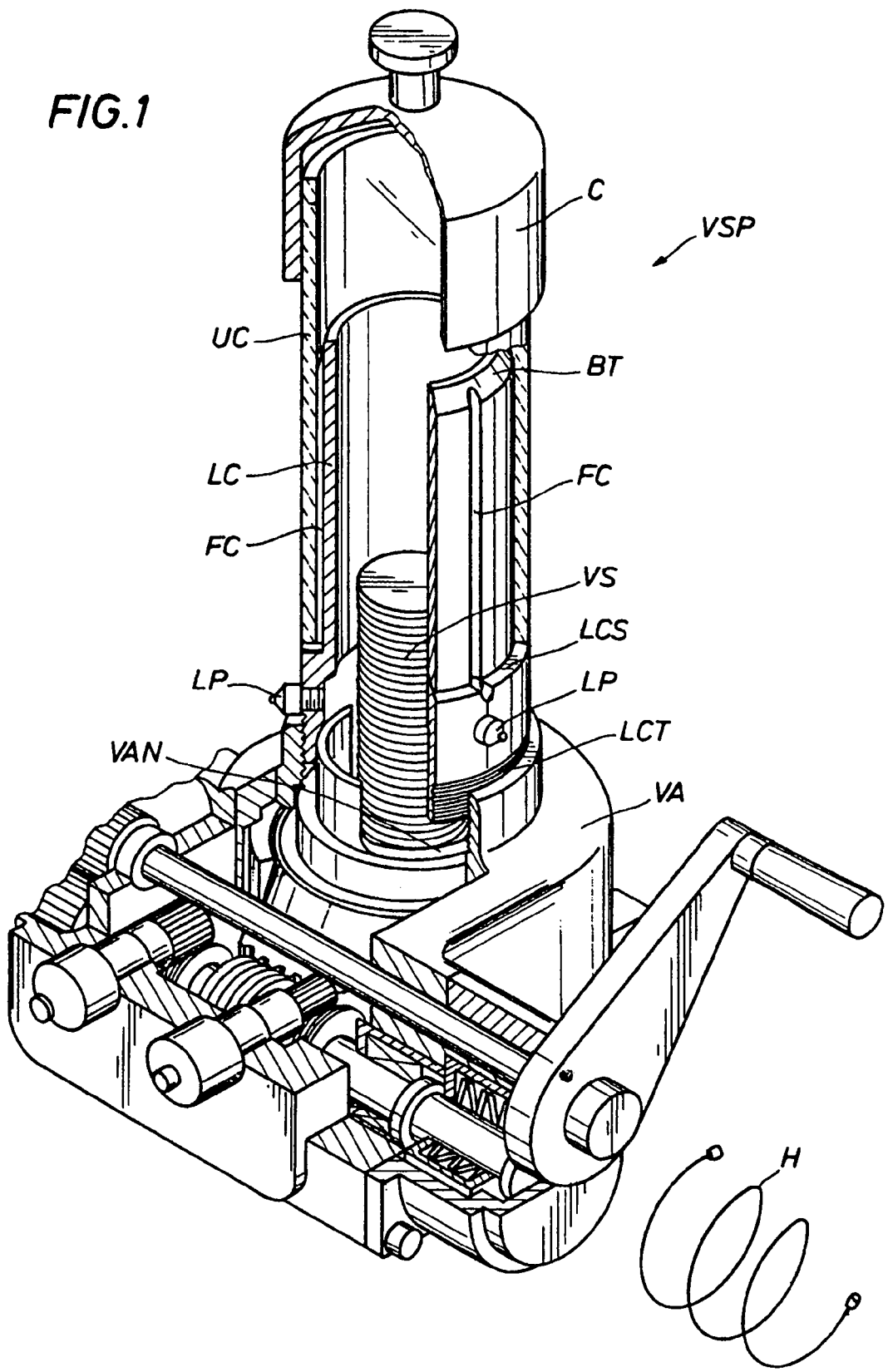
FIG. 1 illustrates a preferred embodiment of a stem protector/lubricator, a perspective view partially in cut-out.

FIG. 1 illustrates a stem protector assembly VSP attached to a valve actuator VA. The preferred embodiment is comprised of upper, outer cylinder UC and lower, inner cylinder LC. Lower cylinder LC is externally threaded at LCT in order to thread into the internal threads of a fitting of valve actuator VA. Lower cylinder LC contains two lubrication ports LP and a lower cylinder shoulder LCS upon which upper cylinder UC rests. Lower cylinder LC contains fluid channels FC comprising vertical grooves formed in its outside circumference. Lower cylinder LC also contains a beveled top BT. Beveled top BT encourages undesired fluid such as water to drain down vertical channels FC and out of a channel in shoulder LCS to a region outside of the valve stem protector VSP assembly. Water that condenses on the inside of upper cylinder UC will be guided by the beveled top of inner cylinder LC to the fluid channels FC. Likewise water that is pushed up over the top of lower cylinder LC will be guided by the beveled top BT to fluid channels FC and thence to outside of the assembly. Water can be pushed up over the top of lower cylinder LC by virtue of adding lubricant grease, for instance, through lubricating ports LP into the cavity or area forming the contact point of valve stem VS and the actuator nut VAN (barely visible) within valve actuator VA. Hose H is also disclosed. Hose H comes with fittings such that it can temporarily or permanently mate with the fittings on lubricating ports LP. Hose H would permit adding lubrication or other fluids from outside to inside the valve stem protector assembly from a distance.

Figure 2:
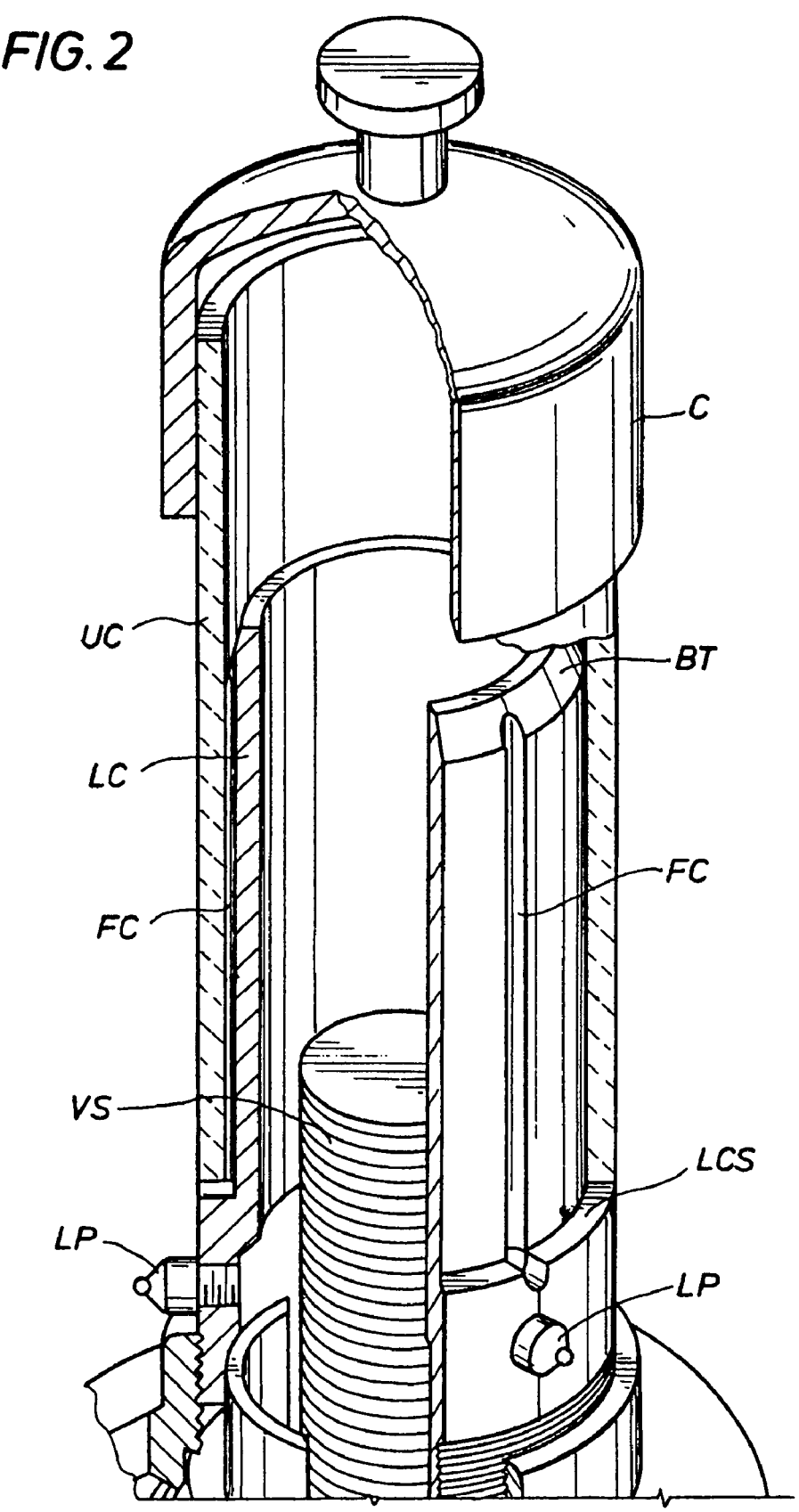
FIG. 2 offers a close up view of portions of FIG. 1.
Figure 3:
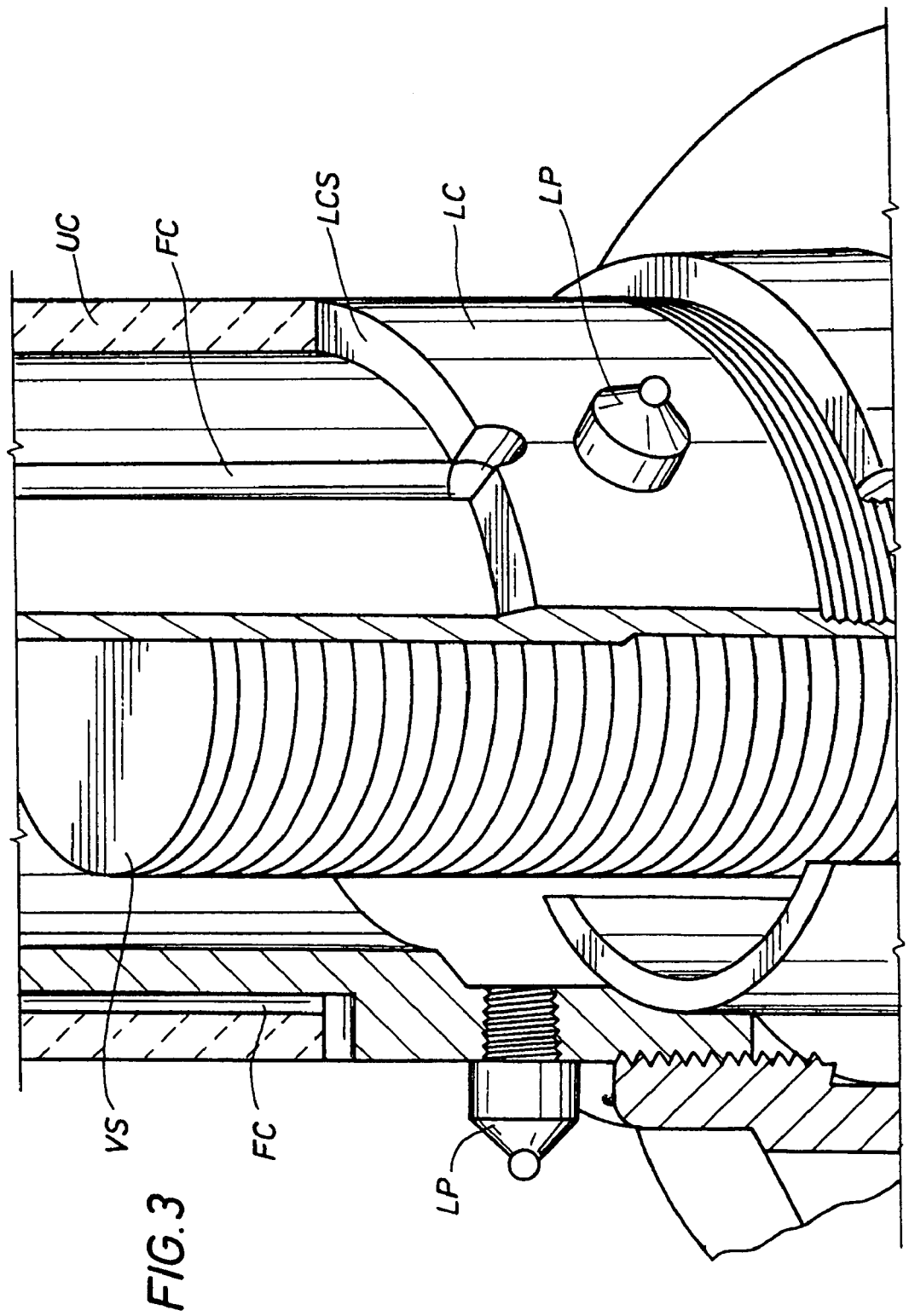
FIG. 3 offers a further close up view of portions of FIG. 1.

FIG. 2 offers a close up of certain features of FIG. 1. FIG. 3 offers a further close up of certain features of FIG. 1.

The foregoing description of preferred embodiments of the invention is presented for purposes of illustration and description, and is not intended to be exhaustive or to limit the invention to the precise form or embodiment disclosed. The description was selected to best explain the principles of the invention and their practical application to enable others skilled in the art to best utilize the invention in various embodiments. Various modifications as are best suited to the particular use are contemplated. It is intended that the scope of the invention is not to be limited by the specification, but to be defined by the claims set forth below. Since the foregoing disclosure and description of the invention are illustrative and explanatory thereof, various changes in the size, shape, and materials, as well as in the details of the illustrated device may be made without departing from the spirit of the invention. The invention is claimed using terminology that depends upon a historic presumption that recitation of a single element covers one or more, and recitation of two elements covers two or more, and the like. Also, the drawings and illustration herein have not necessarily been produced to scale.

What is claimed is:

1. A stem protector system for valves, comprising
a sleeve assembly structured and sized for surrounding a valve stem and for mating with a valve stem actuator, the assembly including
an outer sleeve fitting around at least a portion of an inner sleeve;

the inner sleeve having at least one lubrication port therethrough; and a space between the inner and outer sleeve providing for fluid drainage from inside the assembly to outside the assembly.

2. The stem protector of claim 1 wherein the space is provided, at least in part, by a channel cut in the outside surface of the inner sleeve.

3. The stem protector of claim 1 wherein the inner sleeve provides at least two lubrication ports therethrough.

4. The stem protector of claim 1 wherein the inner sleeve is threadedly attached to the valve actuator.

5. A stem protector system for valves, comprising
an assembly structured and sized for surrounding a valve stem and for mating with a valve stem actuator, the assembly including
at least one lubrication port system, the at least one lubrication port system having at least one port structured to pass lubricant from outside to inside the system; and
at least one drainage port, structured to pass water from inside to outside the system.

6. The system of claim 5 where in the assembly includes a sleeve assembly.

7. The system of claim 5 wherein the port system includes at least one lubricant port and at least one separate drainage port.

8. A method for protecting and lubricating valve stems, comprising:
affixing a valve stem cover assembly over a valve stem and to a valve actuator;
lubricating an interface between the valve stem and a valve actuator portion through a lubrication port provided in the valve stem cover assembly; and
draining water from inside the stem protector assembly to outside the assembly through a drainage port provided by the assembly.

* * * * *